United States Patent [19]

Barbagli

[11] Patent Number: 4,531,601

[45] Date of Patent: Jul. 30, 1985

[54] DEVICE FOR CORRECTING DEVIATIONS FROM RECTILINEAR MOVEMENT OF TRACKED VEHICLES HAVING SEPARATE TRANSMISSIONS FOR RIGHT AND LEFT SIDE TRACKS

[75] Inventor: Rino O. Barbagli, Borgaretto, Italy

[73] Assignee: Fiatallis Europe, S.p.A., Lecce, Italy

[21] Appl. No.: 506,117

[22] Filed: Jun. 20, 1983

[30] Foreign Application Priority Data

Aug. 17, 1982 [IT] Italy .................. 68022 A/82

[51] Int. Cl.$^3$ ............................................. B62D 11/04
[52] U.S. Cl. ...................................... 180/6.48; 60/426
[58] Field of Search ................. 180/6.48; 60/420, 426, 60/459

[56] References Cited

U.S. PATENT DOCUMENTS

| | | | |
|---|---|---|---|
| 3,812,925 | 5/1974 | Lauck et al. | 180/6.48 |
| 3,862,668 | 1/1975 | Ward | 180/6.48 |
| 4,023,637 | 5/1977 | Jackovich | 180/6.48 |

Primary Examiner—Joseph F. Peters, Jr.
Assistant Examiner—Charles R. Watts
Attorney, Agent, or Firm—Robert A. Brown

[57] ABSTRACT

A hydraulic transmission system for tracked vehicles of the type comprising two separate hydrostatic transmissions for driving the right and the left tracks of the vehicle, each including a variable-displacement hydraulic pump provided with a hydraulically operated control for varying the pump displacement. There is provided a pressure regulating device interposed in the connection between the speed control device and the hydraulically operated control for the pumps of the two hydrostatic transmissions, which is arranged to increase and reduce the pressure supplied to the hydraulically operated control of one of the pumps so as to maintain the speeds of the two tracks equal. Preferably, the system further includes a sensor arranged to detect differences in speed of the two vehicle tracks and an actuator arranged to control the pressure regulating device in dependence on the signal received from the sensor.

5 Claims, 3 Drawing Figures

DEVICE FOR CORRECTING DEVIATIONS FROM RECTILINEAR MOVEMENT OF TRACKED VEHICLES HAVING SEPARATE TRANSMISSIONS FOR RIGHT AND LEFT SIDE TRACKS

BACKGROUND OF THE INVENTION

The present invention relates generally to earth moving machinery and more particularly to hydraulic transmission systems for tracked vehicles of the type comprising:

- two separate hydrostatic transmissions for driving the right hand and left hand tracks of the vehicle, each including a variable-displacement hydraulic pump provided with hydraulically-operated control means for varying the pump displacement,
- a hydraulic pilot pump,
- a lever control device, for controlling the speed of the vehicle, said device being interposed between the pilot pump and the said control means for the pumps of the two hydrostatic transmissions and providing at its output, for each position of its control lever corresponding to a predetermined speed of the vehicle,
- a constant pressure which is less than the output pressure of the pilot pump.

In the operation of construction machinery vehicles, tracked vehicles are utilized having a transmission system of the type specified above. Although, on the one hand these vehicles have the particular merits of ease of handling and maneuverability by virtue of the fact that the two tracks are driven by two hydrostatic transmissions that are separate from each other; on the other hand, they have the disadvantage of being subject to deviations from rectilinear movement because of the inevitable differences that exist between the characteristic parameters of the two hydrostatic transmissions (volumetric efficiency of the hydraulic pumps or the hydraulic motors of the two transmissions, characteristics of the two control units) due to manufacturing inaccuracies.

Illustrations depicting the manner in which various solutions have been attempted to solve existing problems may be found in U.S. Pat. Nos. 3,765,173; 3,812,925; 3,862,668; 3,908,374; 4,019,596 and 4,175,628.

SUMMARY OF THE INVENTION

Accordingly, it is an object of the present invention to provide a hydraulic transmission system of the type specified that does not have the disadvantages of the prior art and thus utilizes simple and economic structural means for correcting any deviations of the vehicle from rectilinear movement.

In order to achieve this object, the invention provides a hydraulic transmission system of the type specified at the beginning of the present description, characterized in that it further includes a pressure regulating device which is interposed in the connection between the speed control device and the control means for the pumps of the two hydrostatic transmissions, and is arranged to increase and reduce the pressure supplied to the control means of one of the pumps so as to maintain the speeds of the two tracks equal to each other.

A further object of the hydraulic transmission system according to the invention lies in the fact that the pressure regulating device includes:

- a first input communicating with the output of the speed control device,
- a second input communicating with the output of the pilot pump,
- a first output communicating with the control means associated with the pump of one of the two hydrostatic transmissions,
- a further output communicating with a discharge tank,
- a duct connecting the first input to the first output and including a constriction,
- a main chamber communicating with the duct downstream of the constriction,
- a slide valve member having a first operative end position in which the main chamber communicates with the second input, a second operative end position in which the main chamber communicates with the further output, and a central neutral position,
- two control members arranged to act on respective ones of the two ends of the slide valve member to urge it towards one or other of its two operative end positions,
- two springs interposed between respective ones of the control members and the corresponding end of the slide valve member,
- first and second end chambers adjacent respective ones of the two ends of the slide valve member, the first end chamber communicating with the main chamber, the second end chamber communicating with the first input.

Another object of the present invention, more particularly, with reference to the case in which the speed control device has an output for forward movement and an output for rearward movement and in which the control means associated with the pump of each hydrostatic transmission includes an input for forward movement and an input for rearward movement, is to provide a system according to the invention wherein the pressure regulating device comprises:

- a first input communicating with the forward-movement output of the speed control device,
- a second input communicating with the output of the pilot pump,
- a third input communicating with the rearward-movement output of the speed control device,
- a first output communicating with the forward-movement input of the control means for the pump of one of the two hydrostatic transmissions,
- a second output communicating with the rearward-movement input of the control means of the pump of the other hydrostatic transmission,
- a third output communicating with the discharge tank,
- a first duct connecting the first input to the first output and including a constriction,
- a second duct connecting the third input to the second output, and also including a constriction,
- a main chamber communicating with the first and second ducts downstream of their respective constrictions, by means of a selector valve,
- a slide valve member having a first operative end position, in which the main chamber communicates with the second input, a second operative end position in which the main chamber communicates with the third output, and a neutral central position, two control members arranged to act on respective ones of the two ends of the slide valve member to urge it towards one or other of its operative end positions, two springs interposed between respective ones of the control members and the corresponding end of the slide valve member, first and second end chambers adjacent respective ones of the two ends of the slide valve member, the first end chamber communicating with the main chamber, the second end chamber communicating with the first input and the third input through a further selector valve.

An additional object, preferably, is to provide a system according to the present invention that also includes sensor means arranged to detect differences in speed between the two tracks of the vehicle and actuator means arranged to act on the control members of the pressure regulating device in dependence on the signal received from the sensor means.

Another object of the present invention is to provide an embodiment wherein the sensor means and the actuator means are constituted by a sleeve keyed onto two aligned, facing ends of two shafts rotatable respectively by the two tracks of the vehicles, the sleeve being axially slidable and connected for rotation with one of the two shafts and being connected by means of a helical coupling with the other shaft, whereby differences in speed between the two shafts cause an axial displacement of the sleeve, the sleeve being further provided with two end flanges arranged to act respectively on the two control members of the pressure regulating device.

To allow steering of the vehicle, a friction clutch is interposed in the connection between one of these shafts and the corresponding track.

BRIEF DESCRIPTION OF THE DRAWINGS

The foregoing and other characteristics, objects, features and advantages of the present invention will become more apparent upon consideration of the following description, having reference to the accompanying drawings provided purely by way of non-limiting example, wherein.

DESCRIPTION OF A PREFERRED EMBODIMENT OF THE INVENTION

Figure 1:
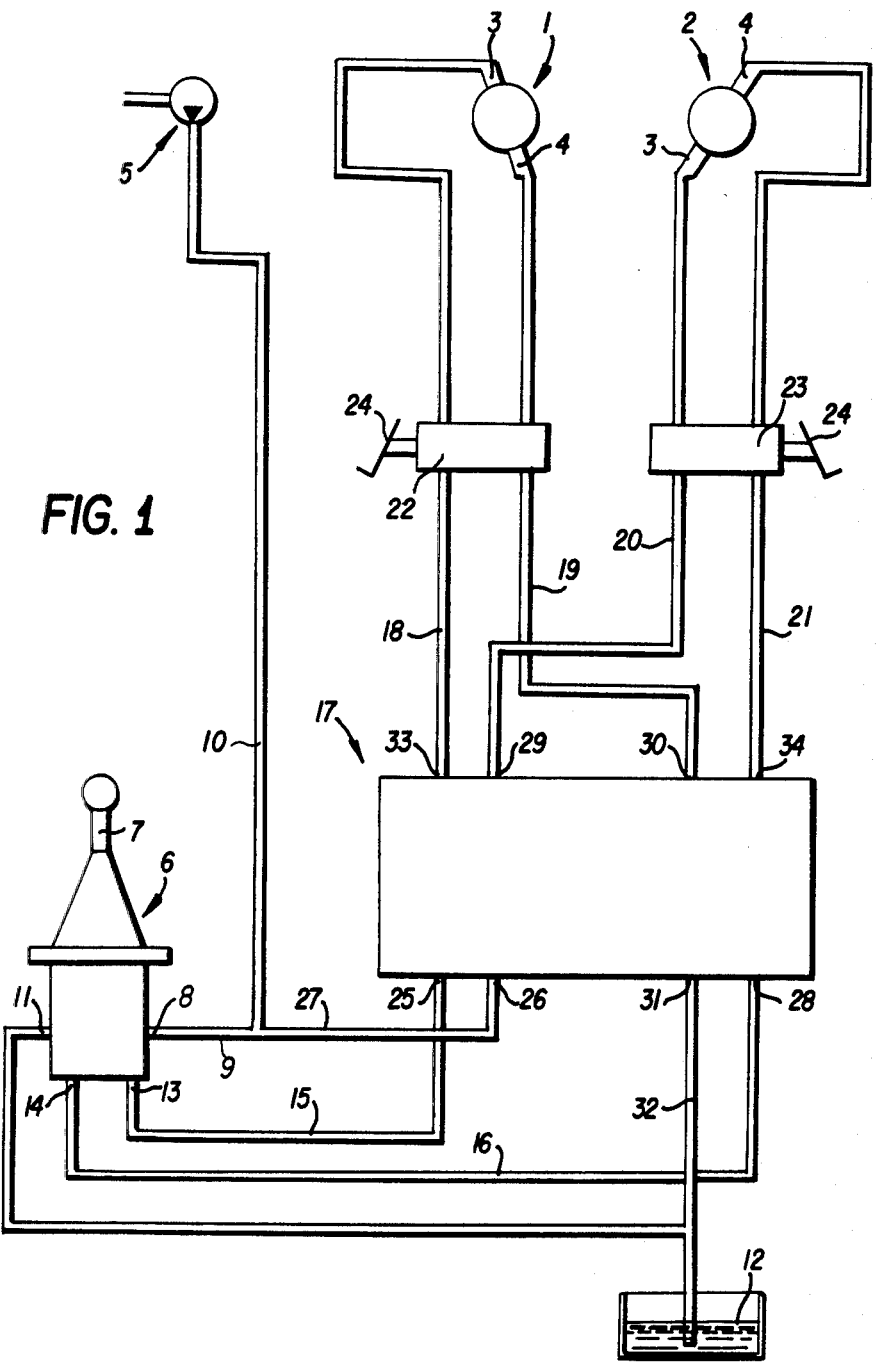
FIG. 1 illustrates schematically a hydraulic transmission system for tracked vehicles provided with a pressure regulating device according to the present invention.

The system illustrated in FIG. 1 can be used in a tracked vehicle including two separate hydrostatic transmissions for driving the right hand and left hand tracks. Each hydrostatic transmission includes a hydraulic pump and a hydraulic motor. The hydraulic pump is of variable displacement and is provided with hydraulically-operated control means for varying the pump displacement.

In FIG. 1 reference numerals 1, 2 indicate the respective control means associated with the pumps of the two hydrostatic transmissions. In particular, control means 1 is associated with a hydrostatic transmission which drives the left hand track of the vehicle while control means 2 is associated with the hydrostatic transmission which drives the right hand track.

The control means 1, 2 each have an input 3 which is fed with fluid under pressure during forward movement of the vehicle and an input 4 which is fed with fluid under pressure during rearward movement.

The hydraulic system further includes a hydraulic pilot pump 5 and an operating device 6 of a type known per se for controlling the speed of the vehicle. The device 6 includes a lever 7 which can be moved in opposite directions to vary the speed of the vehicle during forward and rearward movement. The device 6 includes an input 8 communicating through ducts 9, 10 with the output of the pilot pump 5, an output conduit 11 communicating with a discharge tank 12 and two output conduits 13, 14 which are fed with fluid under pressure respectively in the case of forward and of rearward movement of the vehicle. As is known to persons skilled in the art, for each position of the control lever 7 corresponding to a predetermined speed of the vehicle, the device 6 is arranged to provide a corresponding constant pressure at one of its two outputs 13, 14, the pressure being lower than the delivery pressure of the pilot pump 5 (which is supplied to the input 8).

The outputs 13, 14 for the forward and rearward movement of the speed control device 6, communicate with two ducts 15, 16 which are connected via a pressure regulating device 17 to ducts 18, 19 and 20, 21 communicating respectively with the forward-movement input and the rearward-movement input of the control means 1, 2 associated with the pumps of the two hydrostatic transmissions of the vehicle.

Two steering valves 22, 23 of a type known per se are connected into the ducts 18, 19 and 20, 21 and are each controlled by a pedal 24 and arranged to reduce the pressure fed to the corresponding input 3, 4 so as to cause a reduction in the speed of one track relative to the other track and consequently to cause steering of the vehicle.

The pressure regulating device 17 includes a first input conduit 25 communicating through the duct 15 with the forward-movement output 13 of the speed control device 6, a second input conduit 26 communicating through a duct 27 and through the duct 10 with the output of the pilot pump 5, and a third input conduit 28 communicating through the duct 16 with the rearward-movement output 14 of the speed control device 6.

The pressure regulating device 17 further includes first, second and third output conduits 29, 30, 31. The first output 29 communicates through the duct 20 with the forward-movement input 3 of the control means 2 associated with the pump of the hydrostatic transmission which drives the right hand track. The second output 30 communicates through the duct 19 with the rearward-movement input 4 of the control means 1 associated with the pump of the hydrostatic transmission which drives the left hand track. The third output 31 communicates through a duct 32 with the discharge tank 12.

The pressure regulating device 17 includes two further output conduits 33, 34 communicating respectively with the ducts 18, 21 and connected respectively to the input 25 and to the input 28 through two ducts 35, 36 each including two constrictions 37, 38 (see FIG. 2) disposed one downstream of the other.

Figure 2:
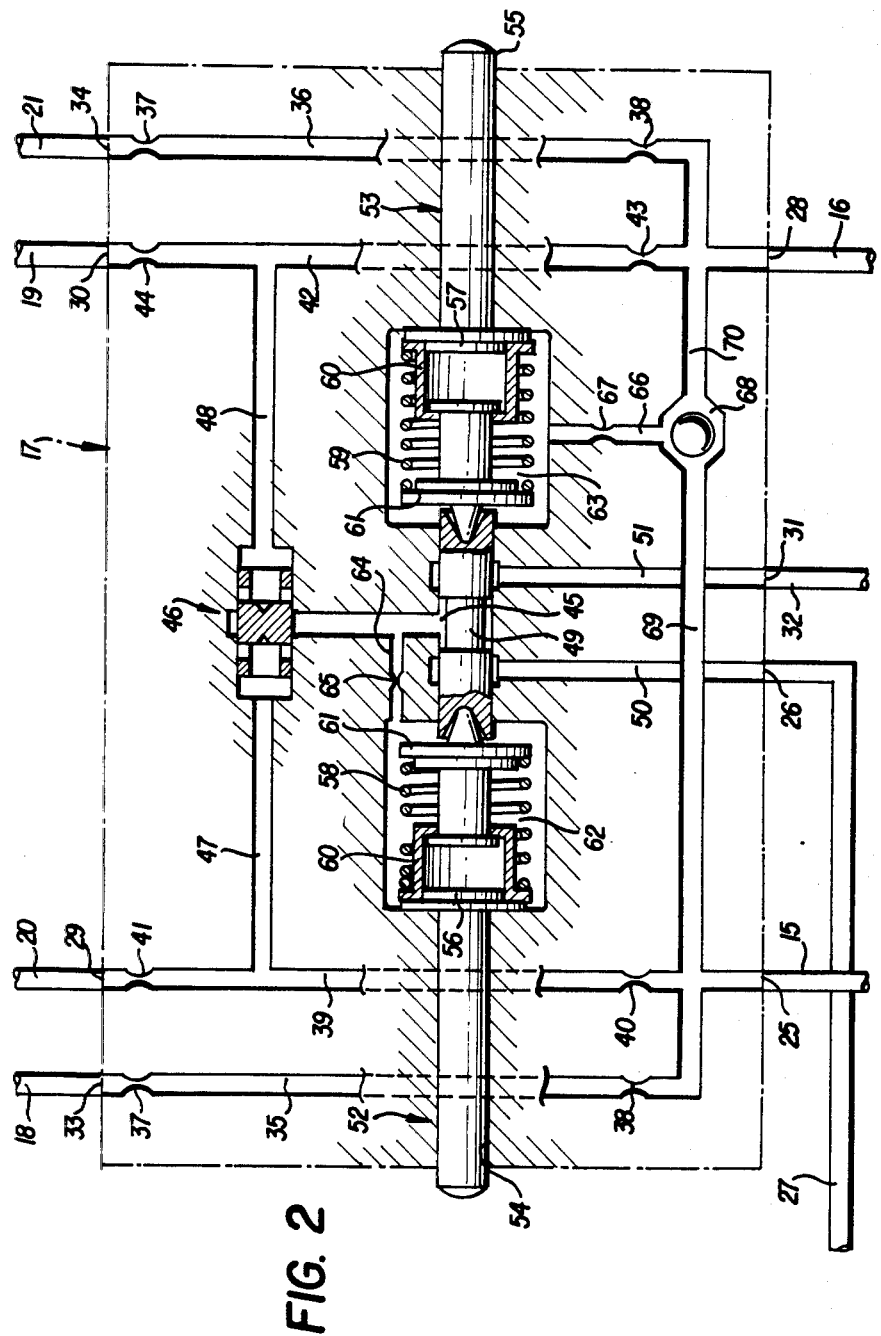
FIG. 2 is a schematic sectional view on an enlarged scale of the pressure regulating device forming part of the system of FIG. 1.

With reference to FIG. 2, the device 17 includes a first duct 39 connecting the input 25 to the output 29 and including two constrictions 40, 41 disposed one downstream of the other, and a second duct 42, connecting the input 28 to the output 30 and including two constrictions 43, 44 also disposed one downstream of the other.

The pressure regulating device 17 further includes a main chamber 45 communicating through a selector valve 46 with two ducts 47, 48. These ducts open into the ducts 39, 42 respectively downstream of the constrictions 40, 43.

Reference numeral 49 indicates a slide valve member having a central neutral position (Illustrated in FIG. 2), a first operative end position (towards the left with reference to FIG. 2) in which the main chamber 45 communicates with the input 26 through a duct 50, and a second operative end position (towards the right with reference to FIG. 2) in which the main chamber 45 communicates with the output 31 through a duct 51.

The device 17 further includes two control members 52, 53 constituted by two shafts slidably mounted within holes 54, 55 in the body of the device and provided with two end heads 56, 57 intended to act respectively on the two ends of the slide valve member 49 to urge it towards one or other of its operative end positions. Two springs 58, 59 are interposed between respective ones of the control members and the corresponding end of the slide valve member. In the particular example illustrated, the ends of each of the two springs 58, 59 bear against two elements 60, 61 which are slidable one within the other and have annular limit shoulders.

Adjacent the two ends of the slide valve member are located first and second end chambers 62, 63 within which are housed the two springs 58, 59.

The chamber 62 communicates through a duct 64 including a constriction 65 with the main chamber 45 of the pressure regulating device.

The chamber 63 communicates on the other hand with the two inputs 25, 28 through a duct 66 including a constriction 67, a selector valve 68, and two ducts 69, 70.

In the example illustrated, the tracked vehicle is provided with a sensor and actuator device 71 (see FIG. 3) arranged to detect any differences in the speeds of the two tracks of the vehicle and consequently to actuate the two control members 52, 53 of the pressure regulating device 17 so as to correct the speed of one or other of the tracks to bring it back to the value of the other track.

The device 71 includes a sleeve 72 keyed onto two aligned, facing ends of two shafts 73, 74 which are rotated by respective ones of the two tracks of the vehicle. The sleeve 72 is coupled for rotation with, and is displaceable axially relative to, the shaft 73. This particular coupling may, for example, be achieved by means of the engagement of a transverse pin 75 in an axial slot 76 of the shaft 73 and in two diametrically opposed holes (not illustrated) in the sleeve 72. The shaft 74 is coupled with the sleeve 72 by a helical coupling (achieved for example by means of the engagement of a transverse pin 75 carried by the shaft 74 in a helical slot 77 in the sleeve 72). Moreover, between the shaft 74 and the corresponding track is interposed a friction clutch 78 which may be of any known type (mechanical, electromagnetic or hydraulic).

Finally, the sleeve 72 has two end flanges 79, 80 which contact respective ones of the two free outer ends of the two control members 52, 53.

Figure 3:
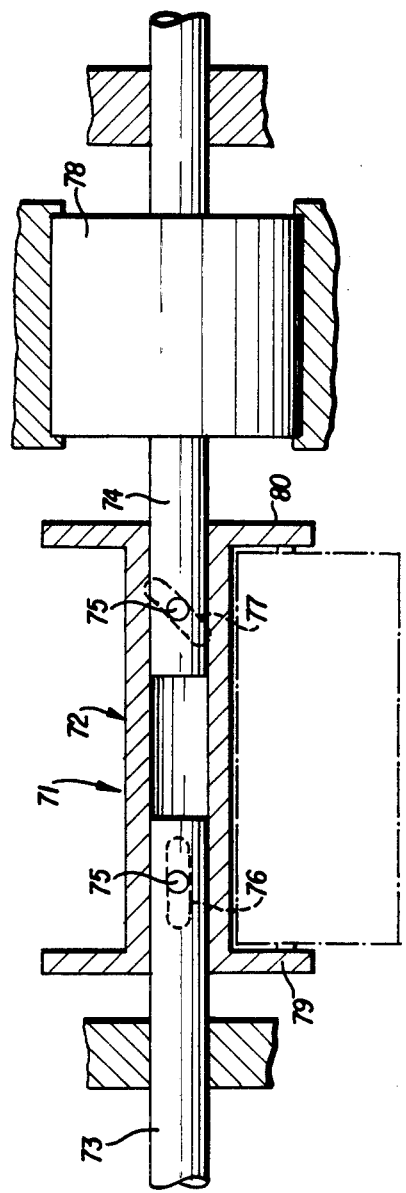
FIG. 3 illustrates schematically an embodiment of the sensor means and actuator means preferably forming part of the system according to the invention.

The operation of the system described above is as follows:

During forward movement of the vehicle in a straight line, as long as the two tracks driven by the two separate hydrostatic transmissions move at the same speed, the sleeve 72 of the device 71 remains in the position illustrated in FIG. 3

When there is a difference in the speeds of the two tracks, the sleeve 72 moves axially relative to the two shafts 73, 74, due to the effect of the different speeds of these shafts and the helical coupling between the sleeve itself and the shaft 74.

As a result of the axial displacement of sleeve 72, one of the two flanges 79, 80 acts on the corresponding control member 52, 53 of the pressure regulating device 17 which consequently varies the speed of one of the two tracks bringing it back to the same speed as the other track.

During the forward movement of the vehicle, the speed control device 6 supplies the duct 15 with fluid at a lower pressure than the pilot pressure provided by the pump 5 to the device 6 through the ducts 9, 10. The pressure in the duct 15 is transmitted through the constrictions 38, 40 and the two ducts 35, 39 to the two ducts 18, 20. These ducts provide fluid under pressure to the control means 1, 2 of the pumps of the two hydrostatic transmissions thus enabling forward movement. At the same time the pressure is conveyed through the duct 47 and the selector valve 46 to the main chamber 45 and to the end chamber 62 of the pressure regulating device. The same pressure is also conveyed through the duct 69, the selector valve 68, and the duct 66 to the end chamber 63.

During forward movement, the device uses the speed of the left hand track as reference and corrects the speed of the right hand track should the device 71 detect a difference in the speeds of the two tracks.

For example, should the speed of the right hand track be less than that of the left hand track, the sleeve 72 of the device 71 moves towards the left (with reference to FIG. 3) and consequently urges the control member 53 of the pressure regulating device 17 towards the left. The slide valve member 49 consequently moves towards the left (with reference to FIG. 2) placing the main chamber 45 (which is at the pressure of the duct 15, which is lower than the delivery pressure of the pilot pump 5) in communication with the duct 50 which is at the delivery pressure of the pilot pump 5. Because the main chamber 45 communicates with the duct 15 through the constriction 40, the communication between this main chamber 45 and the duct 50 causes an increase in the pressure in the chamber 62 and in the duct 39. The consequent increase in the pressure in the duct 20 causes an increase in the speed of the right hand track until the speeds of the two tracks are about equal to each other. In this case, the forces acting on the two ends of the slide valve member 49 are in equilibrium with each other. The force acting on the left hand end (with reference to FIG. 2) is that due to the load of the spring 58 and the pressure existing in the chamber 62. The force acting on the right hand end is that due to the load of the spring 59 and the pressure existing in the chamber 63.

If, during forward movement, the speed of the right hand track increases compared with that of the left hand track the sleeve 72 moves towards the right (with reference to FIG. 3) pushing the control member 52 towards the right (with reference to FIG. 2). The slide valve member 49 is consequently moved towards the right placing the main chamber 45 in communication with the discharge tank 12. The pressure in the duct 20 consequently falls causing a reduction in the speed of the right hand track until the speed of the left hand track is reached.

As specified above, due to the effect of the constriction 40 it is possible to have a pressure in the ducts 39 and 20 which is different from that existing in the duct 15. The pressure in the ducts 35 and 18 is however substantially identical to that existing in the duct 15.

During rearward movement, pressure is directed by the speed control device 6 to the duct 14 and from here, through the pressure regulating device 17 to the two ducts 19, 21 to enable the rearward movement. The pressure is also supplied through the duct 70 and the selector valve 68 to the end chamber 63 and through the duct 48 and the selector valve 46 to the main chamber 45. The operation in this case is the same as that described above with the difference that now the speed of the right hand track is taken as the reference, and the speed of the left hand track is varied so as to maintain it equal to that of the right hand track.

During steering, the sleeve 72 is moved axially to bring it into a limit position after which the friction clutch 78 intervenes to allow the two shafts 73, 74 to rotate at different speeds without causing the operation of the pressure regulating device 17. In this case the pressure in the ducts 18, 20 or 19, 21 is varied by means of the steering valves 22, 23 and the pressure regulating device 17 does not operate because of the presence of the constrictions 37 and 41, 44.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. Hydraulic transmission system for tracked vehicles, including:
    two separate hydrostatic transmission for driving the right hand and left hand tracks of the vehicle, each including a variable-displacement hydraulic pump provided with hydraulically-operated control means for varying the pump displacement,
    a hydraulic pilot pump,
    a lever control device for controlling the speed of the vehicle, said device being interposed between the pilot pump and said control means for the pumps of the two hydrostatic transmissions and being arranged to provide at its output, for each position of its control lever corresponding to a predetermined speed of the vehicle, a constant pressure which is less than the output pressure of the pilot pump,
    a pressure regulating device which is interposed in the connection between the speed control device and said control means for the pumps of the two hydrostatic transmissions, and is arranged to increase and to reduce the pressure supplied to the control means of one of said pumps so as to maintain the speeds of the two tracks equal,
    said pressure regulating device characterized by
    a first input communicating with the output of the speed control device,
    a second input communicating with the output of said pilot pump,
    an output communicating with the control means associated with the pump of one of the two hydrostatic transmissions,
    a further output communicating with a discharge tank,
    a duct connecting said first input to said first output and including a constriction,
    a main chamber communicating with said duct downstream of the constriction,
    a slide valve member having a first operative end position in which the main chamber communicates with the second input, a second operative end position in which the main chamber communicates with said further output, and a neutral central position,
    two control members arranged to act on the two ends of the slide valve member respectively to urge it towards one or other of its two operative end positions,
    two springs interposed between a respective ones of the control members and the corresponding end of the slide valve member,
    first and second end chambers adjacent respective ones of the two ends of the slide valve member, the first end chamber communicating with the main chamber, the second end chamber communicating with said first input.

2. A system according to claim 1, in which the speed control device comprises an output for forward movement and an output for rearward movement, and in which the control means associated with the pump of each hydrostatic transmission includes an input for forward movement and an input for rearward movement, characterized in that said pressure regulating device comprises:
    a first input communicating with the forward-movement output of the speed control device,
    a second input communicating with the output of the pilot pump,
    a third input communicating with the rearward-movement output of the speed control device,
    a first output communicating with the forward-movement input of the control means for the pump of one of the two hydrostatic transmissions,
    a second output communicating with the rearward-movement input of the control means of the pump of the other hydrostatic transmission,
    a third output communicating with the discharge tank,
    a first duct connecting said first input to said first output and including a constriction,
    a second duct connecting said third input to said second output, and also including a constriction,
    a main chamber communicating with the first and second ducts downstream of their respective constrictions, by means of a selector valve,
    a slide valve member having a first operative end position, in which the main chamber communicates with said second input, a second operative end position in which the main chamber communicates with said third output and a neutral central position, two control members arranged to act on respective ones of the two ends of the slide valve member to urge it towards one or other of its operative end positions, two springs interposed between respective ones of the control members and the corresponding end of the slide valve member, first and second end chambers adjacent respective ones of the two ends of the slide valve member, the first end chamber communicating with the main chamber, the second end chamber communicating with the first input and the third input through a selector valve.

3. A system according to claim 1 characterized in that the system further includes sensor means arranged to detect speed differences of the two vehicle tracks, and actuator means arranged to act on said control members of the pressure regulator device in dependence on the signal received from said sensor means.

4. A system according to claim 3, characterized in that the sensor means and the actuator means comprise a sleeve keyed onto two aligned facing ends of two shafts rotated by respective ones of the two tracks of the vehicle, said sleeve being axially slidable and connected for rotation with one of the two shafts and being connected by means of a helical coupling to the other shaft, whereby differences between the speeds of rotation of the two shafts cause an axial displacement of the sleeve; said sleeve being further provided with two end flanges arranged to act on respective ones of the two control members of the pressure regulating device.

5. A system according to claim 4, characterized in that a friction clutch is interposed in the connection between one of the two shafts and the corresponding track.

* * * * *